United States Patent
Xu (10) Patent No.: US 9,563,300 B2
(45) Date of Patent: Feb. 7, 2017

(54) LIQUID CRYSTAL DISPLAY TOUCH SCREEN ARRAY SUBSTRATE AND THE CORRESPONDING LIQUID CRYSTAL DISPLAY TOUCH SCREEN

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 47 days.

(21) Appl. No.: 14/240,479

(22) PCT Filed: Jan. 9, 2014

(86) PCT No.: PCT/CN2014/070355
§ 371 (c)(1),
(2) Date: Feb. 24, 2014

(87) PCT Pub. No.: WO2015/096210
PCT Pub. Date: Jul. 2, 2015

(65) Prior Publication Data
US 2015/0185930 A1    Jul. 2, 2015

(30) Foreign Application Priority Data
Dec. 26, 2013  (CN) .......................... 2013 1 0730048

(51) Int. Cl.
*G06F 3/041* (2006.01)
*G09G 3/36* (2006.01)
(Continued)

(52) U.S. Cl.
CPC ......... *G06F 3/0412* (2013.01); *G02F 1/13338* (2013.01); *G06F 3/0416* (2013.01);
(Continued)

(58) Field of Classification Search
None
See application file for complete search history.

(56) References Cited

U.S. PATENT DOCUMENTS

7,391,402 B2 *  6/2008  Lee ....................... G09G 3/3655
                                                                345/209
8,274,492 B2 *  9/2012  Hotelling .......... G02F 1/134363
                                                                345/173
(Continued)

*Primary Examiner* — Dismery Mercedes
(74) *Attorney, Agent, or Firm* — Andrew C. Cheng (57) ABSTRACT

The present invention discloses a liquid crystal display touch screen array substrate, which comprises multiple pixel units defined by a gate line and a data line, each pixel unit is provided with a thin film transistor and a pixel electrode inside; a common electrode line provided in parallel at the side of each said gate line; which further comprise: a touch circuit unit used for touch positioning, the touch circuit unit comprising a touch emission line and a touch sensing line intersecting each other, and a light sensing unit provided at the intersection and respectively connected to the touch emission line and the touch sensing line. The touch emission line is the common electrode line, and the touch sensing line is parallel with the data line. The embodiment of the present invention correspondingly discloses a liquid crystal display touch screen. According to the embodiment of the present invention, it can enhance the sensitivity of the touch position, reduce the power consumption of the touch display screen, and improve the product yield.

14 Claims, 4 Drawing Sheets

(51) Int. Cl.
*G09G 5/18* (2006.01)
*G02F 1/1333* (2006.01)

(52) U.S. Cl.
CPC ............ *G09G 3/3655* (2013.01); *G09G 5/18* (2013.01); *G09G 2330/021* (2013.01)

(56) References Cited

U.S. PATENT DOCUMENTS

| | | | | |
|---|---|---|---|---|
| 8,760,412 | B2* | 6/2014 | Hotelling | G06F 3/0412 345/173 |
| 2008/0143662 | A1* | 6/2008 | Hong | G09G 3/3677 345/92 |
| 2008/0278451 | A1* | 11/2008 | Lee | G06F 3/0412 345/173 |
| 2009/0135158 | A1* | 5/2009 | Takahashi | G06F 3/044 345/174 |
| 2009/0256816 | A1* | 10/2009 | Kim | G09G 3/3648 345/174 |
| 2009/0284483 | A1* | 11/2009 | Ting | G06F 3/0412 345/173 |
| 2009/0289912 | A1* | 11/2009 | Chen | G06F 3/0412 345/173 |
| 2009/0295692 | A1* | 12/2009 | Lee | G02F 1/13338 345/87 |
| 2010/0073273 | A1* | 3/2010 | Nam | G02F 1/136286 345/92 |
| 2010/0090996 | A1* | 4/2010 | Chou | G02F 1/13338 345/207 |
| 2010/0194697 | A1* | 8/2010 | Hotelling | G06F 3/0412 345/173 |
| 2010/0309162 | A1* | 12/2010 | Nakanishi | G06F 3/044 345/174 |
| 2012/0038585 | A1* | 2/2012 | Kim | G06F 3/0412 345/174 |
| 2012/0162104 | A1* | 6/2012 | Chang | G06F 3/0412 345/173 |
| 2012/0200546 | A1* | 8/2012 | Miyamoto | H01L 27/14623 345/205 |
| 2013/0050148 | A1* | 2/2013 | Jeon | G06F 3/0386 345/175 |
| 2013/0141348 | A1* | 6/2013 | Jamshidi-Roudbari | G06F 3/044 345/173 |
| 2013/0162570 | A1* | 6/2013 | Shin | G06F 3/041 345/173 |
| 2013/0241960 | A1* | 9/2013 | Xu | G09G 3/3413 345/690 |
| 2013/0285952 | A1* | 10/2013 | Huang | G09G 3/3611 345/173 |
| 2014/0028616 | A1* | 1/2014 | Furutani | G06F 3/044 345/174 |
| 2014/0125632 | A1* | 5/2014 | Chen | G06F 3/042 345/175 |
| 2014/0292712 | A1* | 10/2014 | Koito | G06F 3/0416 345/174 |
| 2014/0327654 | A1* | 11/2014 | Sugita | G06F 3/044 345/174 |
| 2015/0035766 | A1* | 2/2015 | Chung | G06F 3/0412 345/173 |
| 2015/0145808 | A1* | 5/2015 | Cho | G06F 3/0412 345/174 |
| 2016/0154515 | A1* | 6/2016 | Mu | G06F 3/0412 345/174 |

* cited by examiner

LIQUID CRYSTAL DISPLAY TOUCH SCREEN ARRAY SUBSTRATE AND THE CORRESPONDING LIQUID CRYSTAL DISPLAY TOUCH SCREEN

CROSS REFERENCE

This application is claiming a priority arisen from a patent application, entitled with "Liquid Crystal Display Touch Screen Array Substrate and the Corresponding Liquid Crystal Display Touch Screen", submitted to China Patent Office on Dec. 26, 2013, designated with an Application Number 201310730048.3. The whole and complete disclosure of such patent application is hereby incorporated by reference. This application also related to application Ser. No. 12/240,683, submitted on the same date, entitled, "Liquid Crystal Display Touch Screen Array Substrate and the Corresponding Liquid Crystal Display Touch Screen"; application Ser. No. 14/240,694, submitted on the same date, entitled, "Embedded Touch Array Substrate and Liquid Crystal Display Panel"; application Ser. No. 14/240,709, submitted on the same date, entitled, "Array Substrate Common Electrode Structure, the Manufacturing Method Thereof, and Array Substrate" assigned to the same assignee.

BACKGROUND OF THE INVENTION

1. Field of the Invention

The present invention relates to the technology fields of thin film transistor liquid crystal display (TFT-LCD), and in particular to a liquid crystal display touch screen array substrate and the corresponding liquid crystal display touch screen.

2. The Related Arts

Liquid crystal display (LCD) technology has developed rapidly. It has made great progress from the size of the screen to the display quality. LCD has several characteristics of small size, low power consumption, and no radiation, which has dominated the field of flat panel display.

Liquid crystal display touch screen is one of the major carriers to integrate the input and the output terminal. Recently, with a series of available products of the handheld devices with compact and lightweight, the market demand for liquid crystal display touch screen is surging.

Figure 1:
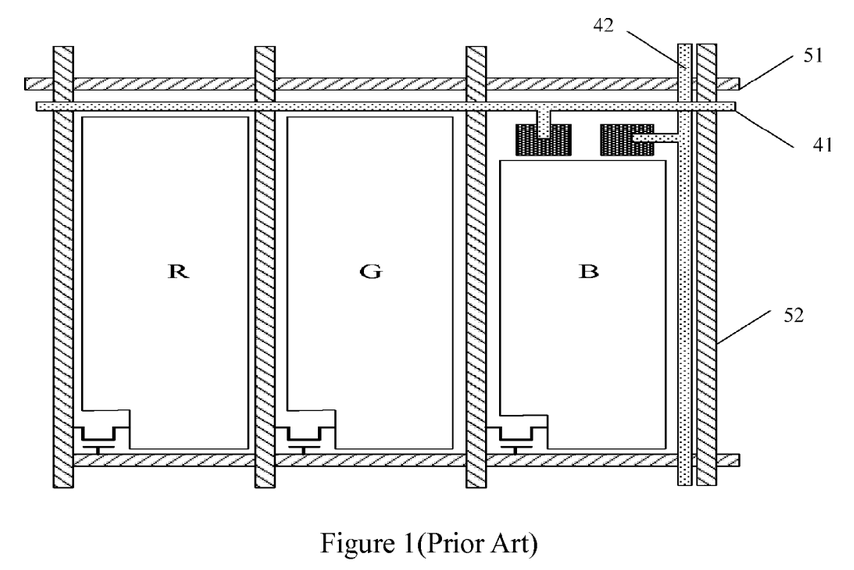
FIG. 1 is a schematic view illustrating the structure of a liquid crystal display touch screen according to the existing technology.

Referring to FIG. 1, the in-cell voltage-sensing liquid crystal display touch screen according to the existing technology utilizes a scanning addressing circuit (including touch emission line 41 and touch sensing line 42) independently realizing the touch function to proceed with touch point positioning. However, there is already a scanning addressing circuit (including horizontal gate line 51 and vertical data line 52) used for display in the pixel structure of the liquid crystal display touch screen. Therefore, when the gate line 51 and the data line 52 used to display intersect with the touch emission line 41 and the touch sensing line 42 used for touch function, it can not only decrease the opening ratio of the pixel, but also increase the process difficulty for preparing liquid crystal display touch screen, and then the bad operation will increase correspondingly. Moreover, the touch emission line 41 needs independent driving signal, which will further increase the power consumption of the liquid crystal display touch screen.

SUMMARY OF THE INVENTION

The technical issue to be solved by the present invention is to provide a liquid crystal display touch screen array substrate and the corresponding liquid crystal display touch screen, which can reduce the power consumption of the touch display screen, reduce the difficulty of the process, and improve the product yield.

In order to solve the technical issue, the embodiment according to the present invention provides a liquid crystal display touch screen array substrate, which comprises multiple pixel units defined by a gate line and a data line, each pixel unit being provided with a thin film transistor and a pixel electrode inside;

wherein, a common electrode line is provided in parallel at the side of each said gate line;

the array substrate further comprising:

a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line, wherein charges on the touch emission line are conducted to the touch sensing line when the light sensing unit is turned on.

Wherein, the common electrode line and the gate line utilize synchronous second-order driving signal, and the voltage difference between the maximum voltage and the minimum voltage of the driving signal of the common electrode line is smaller than that of the gate line.

Wherein, the light sensing unit is a photodiode, the photodiode and the active layer of the thin film transistor utilize the same patterning.

Wherein, the touch circuit unit is provided on the at least one pixel unit.

Wherein, it further comprises an amplifying circuit and a signal processing unit connected with each said touch sensing line.

Correspondingly, the embodiment of the present invention further provides an liquid crystal display touch screen array substrate, which comprises multiple pixel units defined by a gate line and a data line, each pixel unit being provided with a thin film transistor and a pixel electrode inside;

wherein, a common electrode line is provided in parallel at the side of each said gate line;

the array substrate further comprising:

a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line;

wherein, the common electrode line and the gate line utilize synchronous second-order driving signal, and the voltage difference between the maximum voltage and the minimum voltage of the driving signal of the common electrode line is smaller than that of the gate line, wherein charges on the touch emission line are conducted to the touch sensing line when the light sensing unit is turned on.

Wherein, the light sensing unit is a photodiode, the photodiode and the active layer of the thin film transistor utilize the same patterning.

Wherein, the touch circuit unit is provided on the at least one pixel unit.

Wherein, it further comprises an amplifying circuit and a signal processing unit connected with each said touch sensing line.

Correspondingly, the embodiment of the present invention further provides a liquid crystal display touch screen, comprising:

an array substrate, which comprises multiple pixel units defined by a gate line and a data line, each pixel unit being provided with a thin film transistor and a pixel electrode inside;

a color filter substrate, which is opposite to the array substrate; and a liquid crystal layer, which is provided between the array substrate and the color filter substrate;

wherein, a common electrode line is provided in parallel at the side of each said gate line;

the array substrate further comprising:

a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line, wherein charges on the touch emission line are conducted to the touch sensing line when the light sensing unit is turned on.

Wherein, the common electrode line and the gate line utilize synchronous second-order driving signal, and the voltage difference between the maximum voltage and the minimum voltage of the driving signal of the common electrode line is smaller than that of the gate line.

Wherein, the light sensing unit is a photodiode, the photodiode and the active layer of the thin film transistor utilize the same patterning.

Wherein, the touch circuit unit is provided on the at least one pixel unit.

Wherein, it further comprises an amplifying circuit and a signal processing unit connected with each said touch sensing line.

The embodiment of the present invention has the following beneficial effects.

In the embodiment of the present invention, the common electrode has the function of the touch emission line in the touch circuit unit used for touch positioning. That is, the common electrode used for displaying and the touch emission line used for touch are combined as a common scheme. It gives the scanning signal through the IC, which can realize touch positioning while displaying images.

The scheme reduces the line arranged density and increases the opening ratio in pixels by using the common electrode as the touch emission line used for touch. At the same time, it also reduces the processing number, decreases the difficulty of the process, and enhances the sensitivity of the touch position.

Moreover, in the embodiment of the present invention, the common electrode line and the gate line utilize synchronous second-order driving signal, and the voltage difference between the maximum voltage and the minimum voltage of the driving signal of the common electrode line is smaller than that of the gate line, which can reduce the power consumption of the liquid crystal display touch screen used for touch positioning.

In addition, the second-order driving signal on the common electrode can effectively eliminate the effects of the feed through voltage resulted from the parasitic capacitance on the quality of the liquid crystal display screen.

BRIEF DESCRIPTION OF THE DRAWINGS

In order to more clearly illustrate the embodiment of the present invention or the technical issue of the prior art, the accompanying drawings and the detailed descriptions are as follows. Obviously, the following description of the accompanying drawings are only some embodiments according to the present invention, for persons of ordinary skill in this field, they can also obtain other drawings based on these drawings without creative effort.

DETAILED DESCRIPTION OF THE PREFERRED EMBODIMENTS

The following description of the embodiments with reference to the attached drawings, the present invention may be used to illustrate the specific embodiments to implement. The present invention mentioned directional terms, such as "upper", "lower", "front", "rear", "Left", "Right", "top", "bottom", "horizontal", "vertical", etc. only with reference to the accompanying drawings, in the direction. Therefore, the use of directional terms are used to describe and understand the present invention and not intended to limit the present invention.

Figure 2:
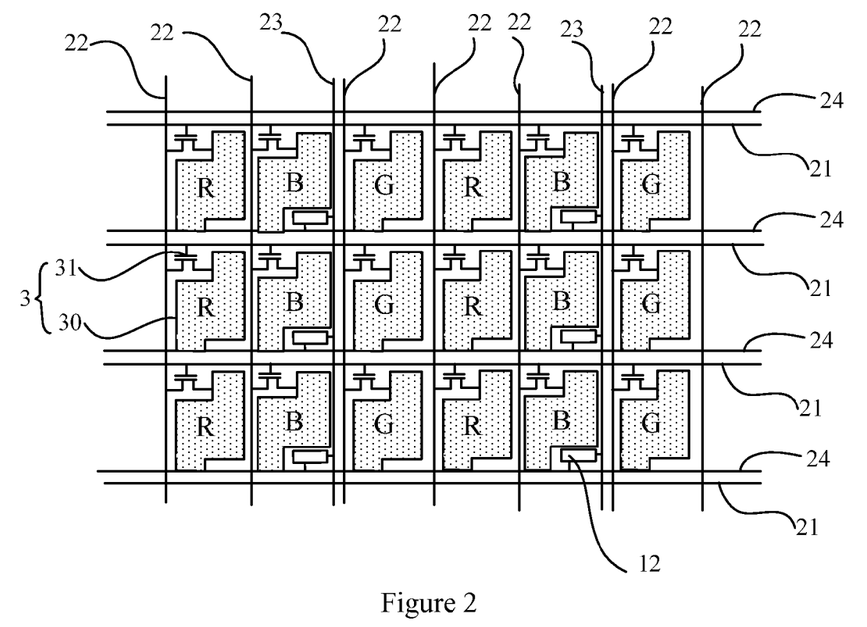
FIG. 2 is a schematic view illustrating the structure of a liquid crystal display touch screen array substrate according to an embodiment of the present invention.
Figure 3:
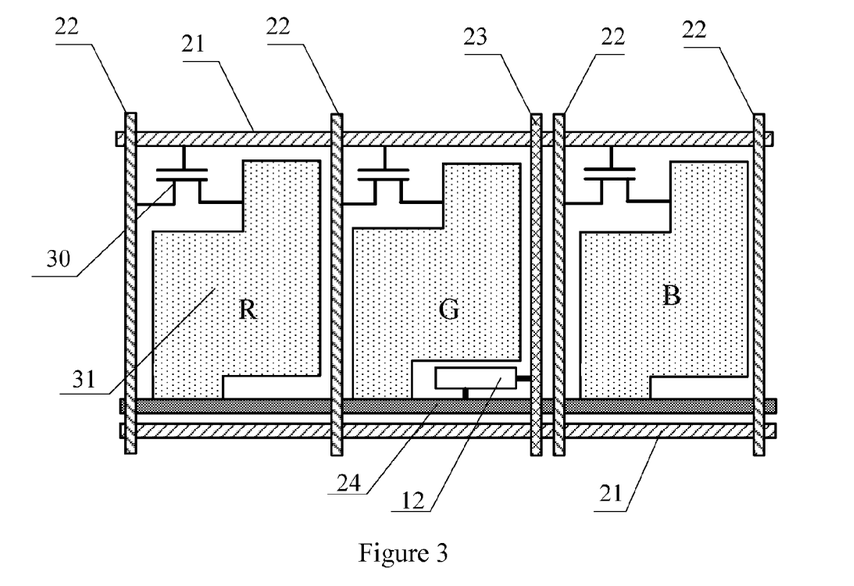
FIG. 3 is a partial enlarged schematic of FIG. 2.

Referring to FIGS. 2 and 3, it shows a liquid crystal display touch screen array substrate according to an embodiment of the present invention. In the embodiment, the liquid crystal display touch screen array substrate comprises multiple pixel units 3 defined by multiple gate lines 21 and multiple data lines 22. Each pixel unit 3 is provided with a thin film transistor 30 and a pixel electrode 31 inside. The thin film transistor 30 is a TFT switch. Wherein, a common electrode line 24 is provided in parallel at the side of each said gate line 21. The array substrate further comprising: a touch circuit unit used for touch positioning, the touch circuit unit comprising a touch emission line and a touch sensing line 23 intersecting each other, and a light sensing unit 12 provided at the intersection and respectively connected to the touch emission line and the touch sensing line. Wherein, the touch emission line is the common electrode line 24, and the touch sensing line 23 is parallel with the data line 22.

The light sensing unit 12 is a photodiode, which is turned on when receiving light and turned off when the light is blocked. Since the light sensing unit 12 is turned on when receiving light, current would flow through the light sensing unit 12, i.e., the charges on one side of the light sensing unit 12 are conducted to another side of the light sensing unit 12, when the light sensing unit 12 receives light. Accordingly, in one aspect, charges on the touch emission line (common electrode line 24 in this embodiment) are conducted to the touch sensing line 23 when the light sensing unit 12 is turned on, or, in another aspect, charges on the touch sensing lines 23 are conducted to the touch emission line (common electrode line 24 in this embodiment) when the light sensing unit 12 is turned on. The photodiode can be formed as a switch to detect if touch or not. If there is touch, the light emitting to the photodiode is blocked. The photosensitive semiconductor in the photodiode is a-Si or low-temperature polysilicon, which utilizes the same patterning as the active layer of the thin film transistor 30.

Wherein, the common electrode line 24 and the gate line 21 utilize synchronous second-order driving signal, and the voltage difference between the maximum voltage and the minimum voltage of the driving signal of the common electrode line 24 is smaller than that of the gate line 21.

Furthermore, the touch circuit unit can be provided on the at least one pixel unit. The pixel size of the liquid crystal display is usually smaller, and the contact area of human finger touching screen is generally larger, which indicates that it is not necessary to provide a touch circuit unit inside the each pixel unit. Since the touch emission line is shared with the gate line, the touch emission line scans each row of the pixel units. Every several pixels provides with a row of the touch sensing circuit according to the practical needs. For example, in an embodiment, the touch sensing lines can be arranged with equal intervals, such as one touch sensing line every two pixels. It can be understood that it can provide one touch sensing line every multiple pixels. In this way, it can reduce the number of the touch sensing lines provided on the array substrate, which can improve the processing efficiency of the touch signal.

Figure 4:
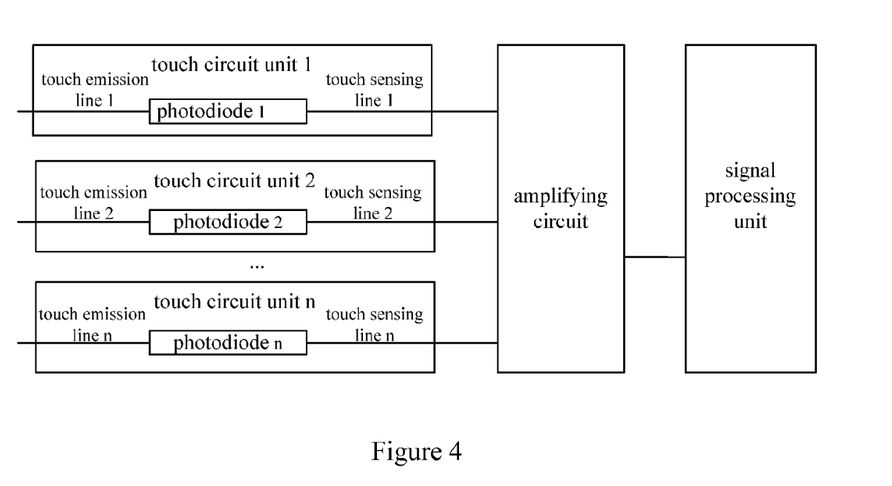
FIG. 4 is a circuit block diagram of a liquid crystal display touch screen array substrate proceeding with touch positioning according to the present invention.

Referring to FIG. 4, it is a circuit block diagram of a liquid crystal display touch screen array substrate proceeding with touch positioning according to the present invention. In the present embodiment, the touch circuit unit is connected to an amplifying circuit. The amplifying circuit is connected to the control sensing line of the touch circuit unit. The amplifying circuit is also connected to a signal processing unit. It can be understood that the amplifying circuit can be an operational amplifying circuit.

Wherein, the photodiode in the touch circuit unit is used to detect if the screen is touched or not. When the photodiode shows no touch on the screen, the photodiode is turned on due to external light. The scanning signal on the gate line is transferred to the signal processing unit through the photodiode and the touch receiving line after being amplified by the amplifying circuit. If there is touch, the photodiode is turned off because the touching object blocks the photodiode, and then the scanning signal on the gate line can not be transferred to the signal processing unit. The signal processing unit can judge if each photodiode is turned on or off through the receiving signal, and then position the touch area according to the position of the cutoff photodiode.

Figure 5:
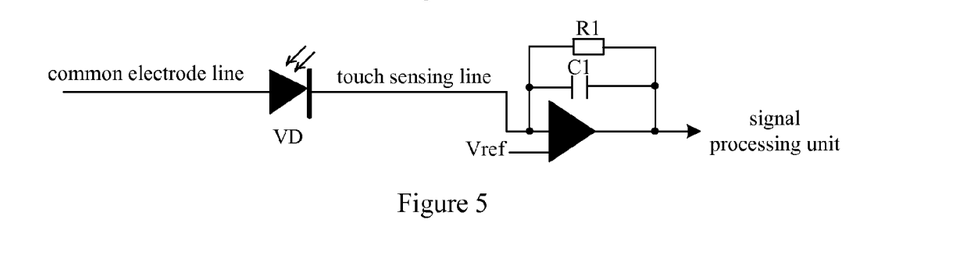
FIG. 5 is a circuit principle diagram of a liquid crystal display touch screen array substrate proceeding with touch positioning according to an embodiment of the present invention.

FIG. 5 shows a circuit principle diagram of a liquid crystal display touch screen array substrate proceeding with touch positioning according to an embodiment of the present invention. It can be seen that the photodiode VD is connected between the touch emission line (common electrode line) and the touch sensing line, which is used to output the driving signal of the common electrode line under normal condition, and disconnect with the common electrode line and output the other electric signal when the external light is blocked. The two different electric signals are transferred to the amplifying circuit, comparing with the reference voltage Vref and outputting the amplified electric signal to the signal processing unit. In this way, the signal processing unit positions the touch area.

Figure 6:
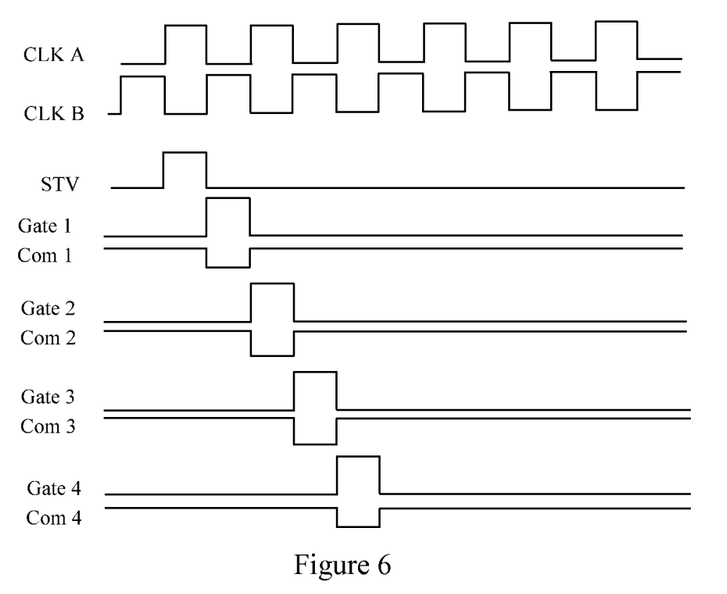
FIG. 6 is a timing relationship diagram of synchronous second-order driving utilized by the liquid crystal display touch screen array substrate according to the present invention.

FIG. 6 shows a timing relationship diagram of synchronous second-order driving utilized by the liquid crystal display touch screen array substrate according to the present invention. It can be seen that, in the present embodiment, the common electrode line 24 and the gate line 21 utilize synchronous second-order driving signal. The Gate 1 to Gate 4 are the driving signals of the common electrode line, the Com 1 to Com 4 are the driving signals of the gate line, and the STV is a scanning trigger signal, which are provided for the array substrate by a timing controller. Wherein, the voltage difference between the maximum voltage and the minimum voltage of the driving signal of the common electrode line 24 is smaller than that of the gate line 21, which can reduce the power consumption for touch positioning of the liquid crystal display screen. Moreover, the common electrode line utilizing the synchronous second-order driving signal can effectively eliminate the effects of the feed through voltage caused by the parasitic capacitance on the image quality of the liquid crystal display screen.

Figure 7:
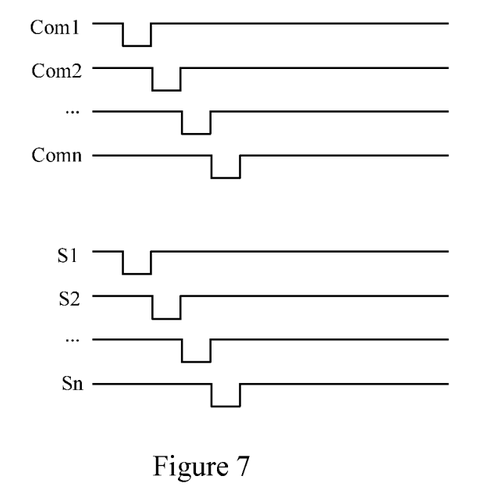
FIG. 7 is a first timing relationship diagram of the touch control circuit unit of the liquid crystal display touch screen array substrate proceeding with touch addressing according to the present invention.
Figure 8:
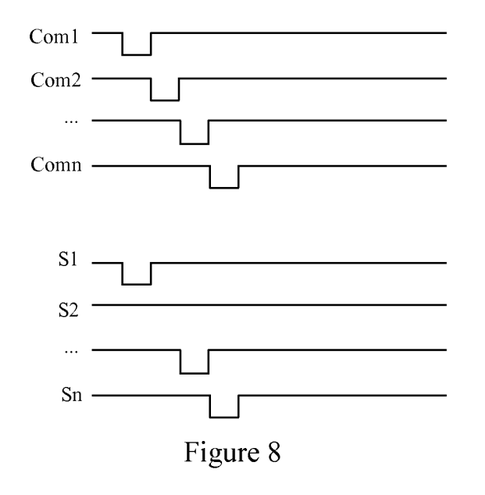
FIG. 8 is a second timing relationship diagram of the touch control circuit unit of the liquid crystal display touch screen array substrate proceeding with touch addressing according to the present invention.

FIGS. 7 and 8 show the first timing relationship diagram of the touch control circuit unit proceeding with touch addressing. Wherein, Com 1, Com 2, . . . Com n respectively represent the driving signal (scanning signal) of the n-th row of the common electrode line of the liquid crystal display touch screen array substrate, and S1, S2, . . . Sm respectively represent the addressing signal of the m-th row of the touch circuit unit.

Referring to FIG. 7, when the liquid crystal display touch screen normally display, that is no touch action, the common electrode line proceeds with periodic scanning according to the refresh frequency, the touch sensing line is connected to the external signal processing unit, and each photodiode is turned on, so the addressing signal received by the external signal processing unit is the same as the driving signal of the common electrode line.

Referring to FIG. 8, when there is touch operation on the liquid crystal display touch screen, the light on one of the photodiode is blocked. The photodiode will be turned off, so the output level of the touch sensing line connected with the photodiode is low level, as the addressing signal S2 shown in Figure. Therefore, the signal processing unit can position the specific touch area according to the addressing signal S2 and the scanning frequency of the common electrode. Similarly, when there is multi-touch operation on the liquid crystal display touch screen, the signal processing unit can respectively position the signal changes of different touch sensing lines to achieve the multi-touch function.

Correspondingly, the embodiment of the present invention further provides a liquid crystal display touch screen which comprises an array substrate comprising multiple pixel units defined by a gate line and a data line, each pixel unit being provided with a thin film transistor and a pixel electrode inside;

a color filter substrate, which is opposite to the array substrate; and a liquid crystal layer, which is provided between the array substrate and the color filter substrate;

a common electrode line is provided in parallel at the side of each said gate line;

the array substrate further comprising:
a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line Preferably, the common electrode line and the gate line utilize synchronous second-order driving signal, and the voltage difference between the maximum voltage and the minimum voltage of the driving signal of the common electrode line is smaller than that of the gate line.

Preferably, the light sensing unit is a photodiode, the photodiode and the active layer of the thin film transistor utilize the same patterning.

Preferably, the touch circuit unit is provided on the at least one pixel unit.

Preferably, it further comprises an amplifying circuit and a signal processing unit connected with each said touch sensing line.

It can be understood that the more detail about the array substrate can refer to the illustration of FIGS. 2 to 6, which is not repeated here.

In summary, the embodiment of the present invention has the following beneficial effects.

In the embodiment of the present invention, the common electrode has the function of the touch emission line in the touch circuit unit used for touch positioning. That is, the common electrode used for displaying and the touch emission line used for touch are combined as a common scheme. It gives the scanning signal through the IC, which can realize touch positioning while displaying images.

The scheme reduces the line arranged density and increases the opening ratio in pixels by using the common electrode as the touch emission line used for touch. At the same time, it also reduces the processing number, decreases the difficulty of the process, and enhances the sensitivity of the touch position.

Moreover, in the embodiment of the present invention, the common electrode line and the gate line utilize synchronous second-order driving signal, and the voltage difference between the maximum voltage and the minimum voltage of the driving signal of the common electrode line is smaller than that of the gate line, which can reduce the power consumption of the liquid crystal display touch screen used for touch positioning.

Moreover, the common electrode line utilizing the synchronous second-order driving signal can effectively eliminate the effects of the feed through voltage caused by the parasitic capacitance on the image quality of the liquid crystal display screen.

In addition, the technical embodiment of the present invention can be applied to large-size liquid crystal display panel.

The preferred embodiments according to the present invention are mentioned above, which cannot be used to define the scope of the right of the present invention. Those modifications and variations are considered encompassed in the scope of protection defined by the claims of the present invention.

What is claimed is:

1. A liquid crystal display touch screen array substrate, which comprises multiple pixel units defined by a gate line and a data line, each pixel unit being provided with a thin film transistor and a pixel electrode inside;

wherein, a common electrode line is provided in parallel at the side of each said gate line;

the array substrate further comprising:

a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line, wherein charges on the touch emission line are conducted to the touch sensing line when the light sensing unit is turned on, wherein the common electrode line and the gate line utilize synchronous second-order driving signal.

2. The liquid crystal display touch screen array substrate as claimed in claim 1, wherein a voltage difference between the maximum voltage and the minimum voltage of the driving signal of the common electrode line is smaller than that of the gate line.

3. The liquid crystal display touch screen array substrate as claimed in claim 2, wherein the light sensing unit is a photodiode, the photodiode and the active layer of the thin film transistor utilize the same patterning.

4. The liquid crystal display touch screen array substrate as claimed in claim 1, wherein the touch circuit unit is provided on the at least one pixel unit.

5. The liquid crystal display touch screen array substrate as claimed in claim 4, wherein it further comprises an amplifying circuit and a signal processing unit connected with each said touch sensing line.

6. A liquid crystal display touch screen array substrate, which comprises multiple pixel units defined by a gate line and a data line, each pixel unit being provided with a thin film transistor and a pixel electrode inside;

wherein, a common electrode line is provided in parallel at the side of each said gate line;

the array substrate further comprising:

a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line;

wherein, the common electrode line and the gate line utilize synchronous second-order driving signal, and a voltage difference between the maximum voltage and the minimum voltage of the driving signal of the common electrode line is smaller than that of the gate line, wherein charges on the touch emission line are conducted to the touch sensing line when the light sensing unit is turned on.

7. The liquid crystal display touch screen array substrate as claimed in claim 6, wherein the light sensing unit is a photodiode, the photodiode and the active layer of the thin film transistor utilize the same patterning.

8. The liquid crystal display touch screen array substrate as claimed in claim 7, wherein the touch circuit unit is provided on the at least one pixel unit.

9. The liquid crystal display touch screen array substrate as claimed in claim 7, wherein it further comprises an amplifying circuit and a signal processing unit connected with each said touch sensing line.

10. A liquid crystal display touch screen, comprising:
an array substrate, which comprises multiple pixel units defined by a gate line and a data line, each pixel unit being provided with a thin film transistor and a pixel electrode inside;
a color filter substrate, which is opposite to the array substrate; and
a liquid crystal layer, which is provided between the array substrate and the color filter substrate;
wherein, a common electrode line is provided in parallel at the side of each said gate line;
the array substrate further comprising:
a touch circuit unit used for touch positioning, the touch circuit unit comprising a touch emission line and a touch sensing line intersecting each other, and a light sensing unit provided at the intersection and respectively connected to the touch emission line and the touch sensing line, the touch emission line being the common electrode line, and the touch sensing line being parallel with the data line, wherein charges on the touch emission line are conducted to the touch sensing line when the light sensing unit is turned on,
wherein the common electrode line and the gate line utilize synchronous second-order driving signal.

11. The liquid crystal display touch screen as claimed in claim 10, wherein a voltage difference between the maximum voltage and the minimum voltage of the driving signal of the common electrode line is smaller than that of the gate line.

12. The liquid crystal display touch screen as claimed in claim 11, wherein the light sensing unit is a photodiode, the photodiode and the active layer of the thin film transistor utilize the same patterning.

13. The liquid crystal display touch screen as claimed in claim 12, wherein the touch circuit unit is provided on the at least one pixel unit.

14. The liquid crystal display touch screen as claimed in claim 13, wherein it further comprises an amplifying circuit and a signal processing unit connected with each said touch sensing line.

* * * * *